United States Patent [19]
Hughes

[11] 3,907,780

[45] Sept. 23, 1975

[54] PREPARATION OF CARBODIIMIDE-CONTAINING ISOCYANATES

[75] Inventor: Jeffrey Hughes, Manchester, England

[73] Assignee: Imperial Chemical Industries Limited, London, England

[22] Filed: Jan. 2, 1974

[21] Appl. No.: 429,807

[30] Foreign Application Priority Data

Jan. 15, 1973 United Kingdom.................. 2035/73

[52] U.S. Cl.................... 260/239 A; 260/2.5 AT; 260/77.5 AT; 260/453 AR; 260/453 P
[51] Int. Cl.$^2$.............. C07C 119/055; C07D 229/00
[58] Field of Search....... 260/453 P, 453 AR, 239 A

[56] References Cited
UNITED STATES PATENTS

| | | |
|---|---|---|
| 3,056,835 | 10/1962 | Monagle et al..................... 260/551 |
| 3,502,722 | 3/1970 | Newmann....................... 260/453 X |
| 3,761,502 | 9/1973 | Man et al........................... 260/453 |

*Primary Examiner*—Lewis Gotts
*Assistant Examiner*—Dolph H. Torrence
*Attorney, Agent, or Firm*—Cushman, Darby & Cushman

[57] ABSTRACT

A process for converting at least a proportion of the isocyanate groups in an organic isocyanate into carbodiimide groups by heating the organic isocyanate with an organic phosphorus containing catalyst for the carbodiimide-forming reaction and an active hydrogen containing compound as co-catalyst. Further reaction of the carbodiimide groups with isocyanate groups results in the formation of uretonimines. The products of the process are useful in the manufacture of polyurethanes.

10 Claims, No Drawings

PREPARATION OF CARBODIIMIDE-CONTAINING ISOCYANATES

This invention relates to isocyanates and the manufacture of carbodiimides therefrom.

It is known to convert isocyanates to carbodiimides by heating and in particular it is known to carry out the reaction in the presence of phosphorus containing catalysts such as organic phosphates and phosphoramides.

We have now found that the efficiency of such catalysts may be improved by the incorporation of active hydrogen containing compounds as co-catalyst.

Thus according to the present invention there is provided a process for converting at least a proportion of the isocyanate groups in an organic isocyanate into carbodiimide groups by heating the organic isocyanate with an organic phosphorus containing catalyst for the carbodiimide-forming reaction and an active hydrogen containing compound as co-catalyst.

Any organic isocyanate may be used in the present process which is particularly applicable to organic isocyanates containing two or more isocyanate groups, i.e. polyisocyanates. As examples of organic isocyanates which may be used there may be mentioned tolylene diisocyanates including the well-known commercially available mixtures of the 2,4- and 2,6-isomers thereof, diphenylmethane diisocyanates and the polyisocyanate compositions, often described as crude diphenylmethane diisocyanates obtained by phosgenating a crude mixture of polyamines produced by condensation of aniline and formaldehyde in the presence of acid catalysts, and comprising diphenylmethane diisocyanate in admixture with higher methylene bridged polyphenyl polyisocyanates of higher isocyanate functionality. Mixtures of polyisocyanates for example tolylene diisocyanate and diphenylmethane diisocyanate may also be used. The invention is not confined to pure distilled isocyanates but may also be used with crude non-distilled isocyanates such as crude products of the phosgenation of tolylene diamines or residues obtained therefrom after distillation or some or all of the diisocyanate.

Refined, i.e. distilled or crystallized diphenylmethane diisocyanates are solids and the invention is particularly applicable to such isocyanates, as conversion of a proportion of the isocyanate groups in such isocyanates to carbodiimides gives liquified compositions of the said isocyanates.

Although the process of the present invention may be used for conversion of isocyanates to carbodiimides it has been found particularly useful for the conversion of a proportion only of the isocyanate groups into carbodiimide groups and in this aspect is particularly useful for producing isocyanates containing a proportion of uretonimine groups, say from 3% to 10% by weight, as described in respect of tolylene diisocyanates in our copending British Application No. 27442/71.

Uretonimine groups are produced by reacting an isocyanate group with a carbodiimide group and may be easily introduced into an isocyanate composition by converting some of the isocyanate groups to carbodiimide groups by a reaction in which two isocyanate groups react to form a carbodiimide group for example by the process of the present invention and then allowing the carbodiimide groups to react with a further portion of the isocyanate to form uretonimine groups.

Once carbodiimide groups have been introduced into for example, a tolylene diisocyanate composition, reaction between carbodiimide groups and isocyanate groups takes place with formation of uretonimine groups. In order to permit this reaction to proceed to near completion it is normally necessary to allow the reaction mixture to stand for a time after heating to form carbodiimide, for the uretonimine forming reaction to take place. Conversion to uretonimine may not normally go to absolute completion and there sometimes remains in the composition a small amount of carbodiimide which is not converted to uretonimine despite the presence of excess isocyanate. This may be in the form of carbodiimide dimer.

Thus the present process may be used for the introduction of a number of carbodiimide groups into a polyisocyanate composition and the product allowed to stand to convert at least a proportion of such groups to uretonimine groups by further reaction. The final products containing a proportion of uretonimine groups are useful as polyisocyanate compositions for the manufacture of polyurethane foams having a valuable range of properties, by processes as described in our copending British Application No. 27442/71, wherein the preparation and use of uretonimine group-containing tolylene diisocyanate compositions is described.

In carrying out the process of the present invention the amount of phosphorus containing catalyst used is a catalytic quantity and although this may vary widely we prefer to use from 0.1 % to 10 % by weight of the isocyanate.

In respect of the co-catalyst, it will be realized that use of an excess of active hydrogen-containing compound will only result in loss of isocyanate groups and we therefore prefer to use from 0.05% to 5% especially 0.05% to 1% of co-catalyst by weight of the isocyanate.

Although formation of carbodiimide groups may take place with certain of the phosphorus containing catalysts at room temperature it is preferred that the mixture of isocyanate and catalyst be heated at a temperature of from 40°C to 220°C preferably 120°C to 200°C in order that the reaction proceeds a reasonable rate. The degree of heating or the length of reaction time required will depend on the degree of conversion to carbodiimide which is required. The reaction conditions will vary with different catalysts but can easily be determined experimentally.

Organic phosphorus-containing catalysts which may be used in the process of the invention include organic phosphates or phosphonates, phosphoramides, phosphonamides and triarylamidophosphates.

Representative examples of catalysts include triethyl phosphate, tributyl phosphate, trimethyl phosphate, triphenyl phosphate, triallyl phosphate, bis($\beta$-chloroethyl)vinyl phosphonate, hexamethyl phosphoramide, N,N,N',N'-tetradodecyl dodecylphosphonamide and triphenyl amido phosphate.

The trialkyl phosphate and phosphoramide type catalysts are preferred as they enable a better control of the reaction. The trialkyl phosphate type catalysts are relatively inactive on standing at room temperature for long periods of time. The phosphoramide type catalysts may be rendered inactive by complex formation with an equivalent amount of chloroform or similar coupling agent. Although more vigorous catalysts are known and may be used e.g. phospholene oxides, phosphetane oxides, these tend to produce polymeric carbodiimides and are very active at room temperatures and hence require removal if a stable product is to be obtained.

Although a solvent may be used, this is not normally found to be necessary if the isocyanate is liquid.

Any active hydrogen-containing compound may be used as co-catalyst the only criterion being that the compound should contain at least one hydrogen atom capable of taking part in the Zerewitinoff reaction.

We have found that water is a preferred co-catalyst and is operative even in small amounts of the order of 0.05 % to 1 %. Water introduced into the reaction mixture may react to form ureas and biurets and such compounds which themselves contain active hydrogen atoms act as co-catalysts.

Other active hydrogen containing compounds which may be used include aromatic or aliphatic amines such as aniline and diethylamine, phenols, alcohols, carboxylic acids, mercaptans, acetoacetonates, malononitriles, β-diketones or other groups having active hydrogen atoms by virtue of being adjacent to electron withdrawing groups.

Carbodiimides made by the process of the present invention may be used in the manufacture of polymers and partial carbodiimide conversion products may be further converted to uretonimine containing isocyanate compositions useful in the manufacture of polyurethanes.

The invention is illustrated but not limited by the following examples in which all parts are by weight except where otherwise stated.

EXAMPLES 1–7

Tolylene diisocyanate (80:20 mixture of the 2,4- and 2,6-isomers) was heated under an atmosphere of nitrogen with the catalyst hexamethylene phosphoramide and the respective cocatalysts as indicated in the following table. After completion of the heating period the reaction mixture was cooled to below 60°C and the catalyst deactivated by the addition of an equivalent amount of chloroform.

The reaction mixture was then allowed to stand to permit conversion of the carbodiimide groups to uretonimine groups by reaction with further isocyanate groups, the degree of conversion to carbodiimide groups was then measured by measuring the uretonimine content by infra-red spectrometry.

The activity of the co-catalyst systems is illustrated by the uncreased conversion to carbodiimide groups when using a co-catalyst under the same reaction conditions and the similar degree of conversion obtained using a co-catalyst and a shorter heating cycle.

Examples 1, 3, 5 and 7 are for purposes of comparison.

EXAMPLES 8 – 10

4,4'-diisocyanatodiphenylmethane (containing traces of the 2,4'-isomer) was heated at 175°C for 4 hours under an atmosphere of nitrogen with the catalysts shown in Table 2. After cooling rapidly to below 60°C, the isocyanate content was determined by reacting a weighed amount of the sample with a standard solution of di-n-butylamine, then back-titrating with acid to determine the excess amine.

The additional activity of the co-catalyst system is clearly shown by the increased conversion to carbodiimide groups as measured by the fall in isocyanate group content.

Infra red spectroscopy showed the presence of substantial quantities of carbodiimide and uretonimine groups in the product from Example 10.

Table 2

| Example No. | Catalyst used | –NCO group content % w/w |
|---|---|---|
| 8 | 0.1% water | 33.4 |
| 9 | 1% Hexamethylphosphoramide | 32.18 |
| 10 | 1% Hexamethylphosphoramide + 0.1% water | 30.6 |

Note: Diisocyanatodiphenylmethane has an –NCO group content of 33.6% w/w

We claim:

1. A process for converting isocyanate groups in an organic isocyanate selected from the group consisting of tolylene diisocyanates, diphenylmethane diisocyanates and polyisocyanate compositions comprising diphenylmethane diisocyanate in admixture with higher methylene bridged polyphenyl polyisocyanates of higher isocyanate functionality, into carbodiimide groups by heating the organic isocyanate with an organic phosphorus containing catalyst for the carbodiimide-forming reaction, selected from the group consisting of organic phosphates or phosphonates, phosphoramides, phosphonamides and triarylamidophosphates, and an active hydrogen containing compound as co-catalyst, selected from the group consisting of water and aniline.

Table 1

| Example No. | Catalyst System | Reaction Conditions | NCO Value (%) | Uretonimine Groups (%) | Carbodiimide Groups (%) | Biuret Groups (%) |
|---|---|---|---|---|---|---|
| 1 | 1 % hexamethyl phosphoramide | 4 hrs. at 175°C | 40.4 | 3.0 | | |
| 2 | 1 % hexamethyl phosphoramide + 0.1 % Water | 2 hrs at 175°C | 39.6 | 2.7 | | |
| 3 | 0.1 % Water | 4 hrs. at 175°C | 46.5 | 0.6 | | |
| 4 | 1 % hexamethyl phosphoramide + 0.5 % tolylene diisocyanate urea | 4 hrs. at 175°C | 34.8 | 5.6 | 1.0 | |
| 5 | j000042% tolylene diisocyanate urea | 4 hrs. at 175°C | 43.2 | 0.2 | | |
| 6 | 1 % hexamethyl phosphoramide + 1 % aniline | 3 hrs. at 175°C | 22.1 | 8.4 | 6.4 | |
| 7 | 1 % aniline | 3 hrs. at 175°C | 43.6 | 0.25 | | 1.2 |

2. A process as claimed in claim 1 wherein the organic isocyanate is a tolylene diisocyanate.

3. A process as claimed in claim 1 wherein the organic isocyanate is a refined diphenylmethane diisocyanate.

4. A process as claimed in claim 1 wherein the carbodiimide groups are allowed to react further to convert at least a proportion of such groups to uretonimine groups and the final product contains from 3% to 10% by weight of uretonimine groups.

5. A process as claimed in claim 1 wherein the amount of phosphorus containing catalyst is from 0.1% to 10% by weight of the isocyanate.

6. A process as claimed in claim 1 wherein the amount of co-catalyst used is from 0.05% to 5% by weight of the isocyanate.

7. A process as claimed in claim 6 wherein the amount of co-catalyst is from 0.05% to 1% by weight of the isocyanate.

8. A process as claimed in claim 1 wherein heating is carried out at a temperature of from 40°C to 220°C.

9. A process as claimed in claim 1 wherein the catalyst is a phosphoramide.

10. A process as claimed in claim 9 wherein the phosphoramide catalyst is rendered inactive after the conversion, by complex formation with an equivalent amount of chloroform.

* * * * *